March 15, 1932.  E. LEYONDRE  1,850,018
MOLDING MACHINE
Filed Aug. 16, 1929    9 Sheets-Sheet 1

E. Leyondre
INVENTOR

By: Marks & Clerk
Attys.

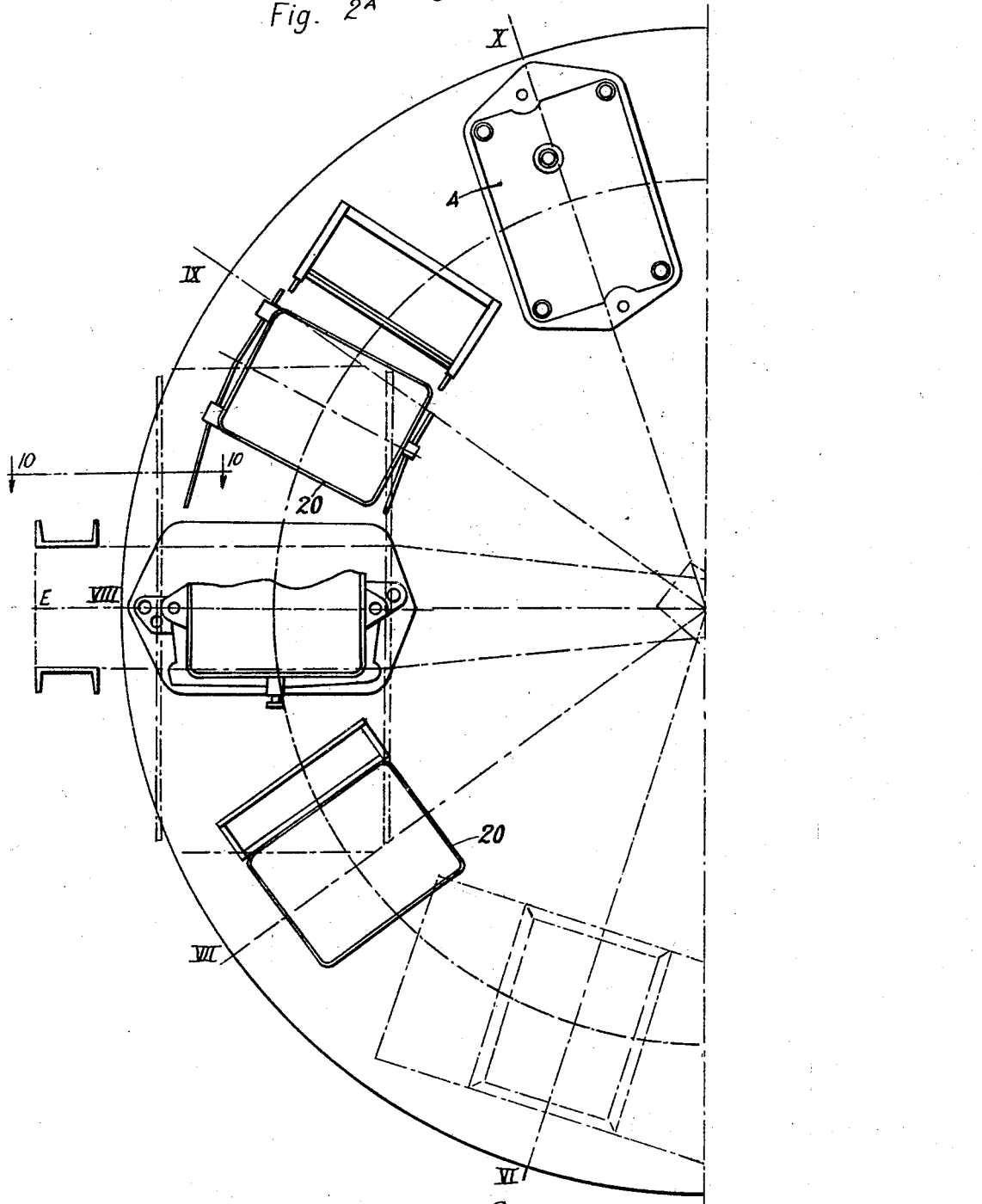

March 15, 1932. E. LEYONDRE 1,850,018
MOLDING MACHINE
Filed Aug. 16, 1929 9 Sheets-Sheet 3
Fig. 2<sup>B</sup>
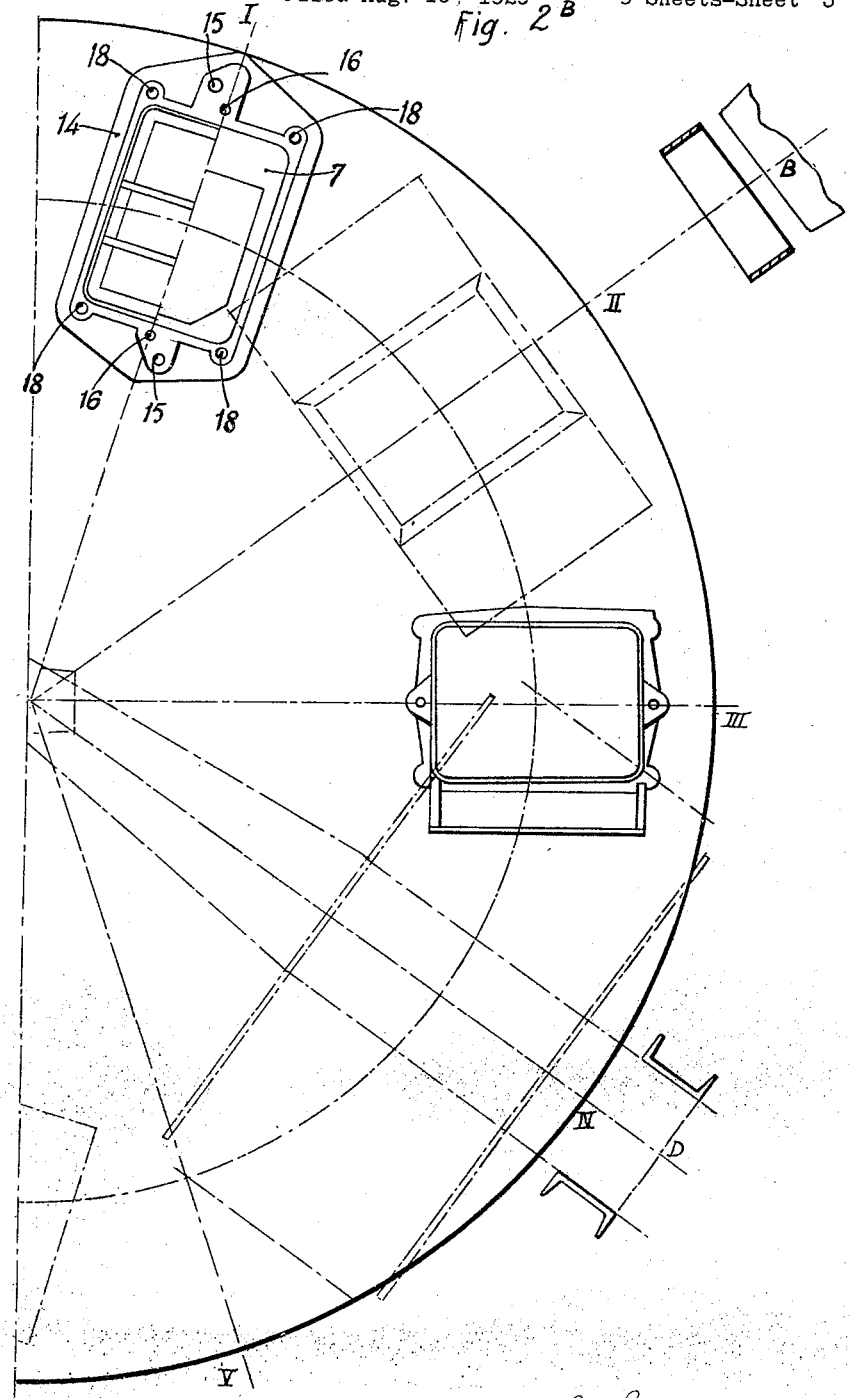
E. Leyondre
INVENTOR
By Marks & Clerk
Attys.

March 15, 1932. E. LEYONDRE 1,850,018
MOLDING MACHINE
Filed Aug. 16, 1929 9 Sheets-Sheet 4
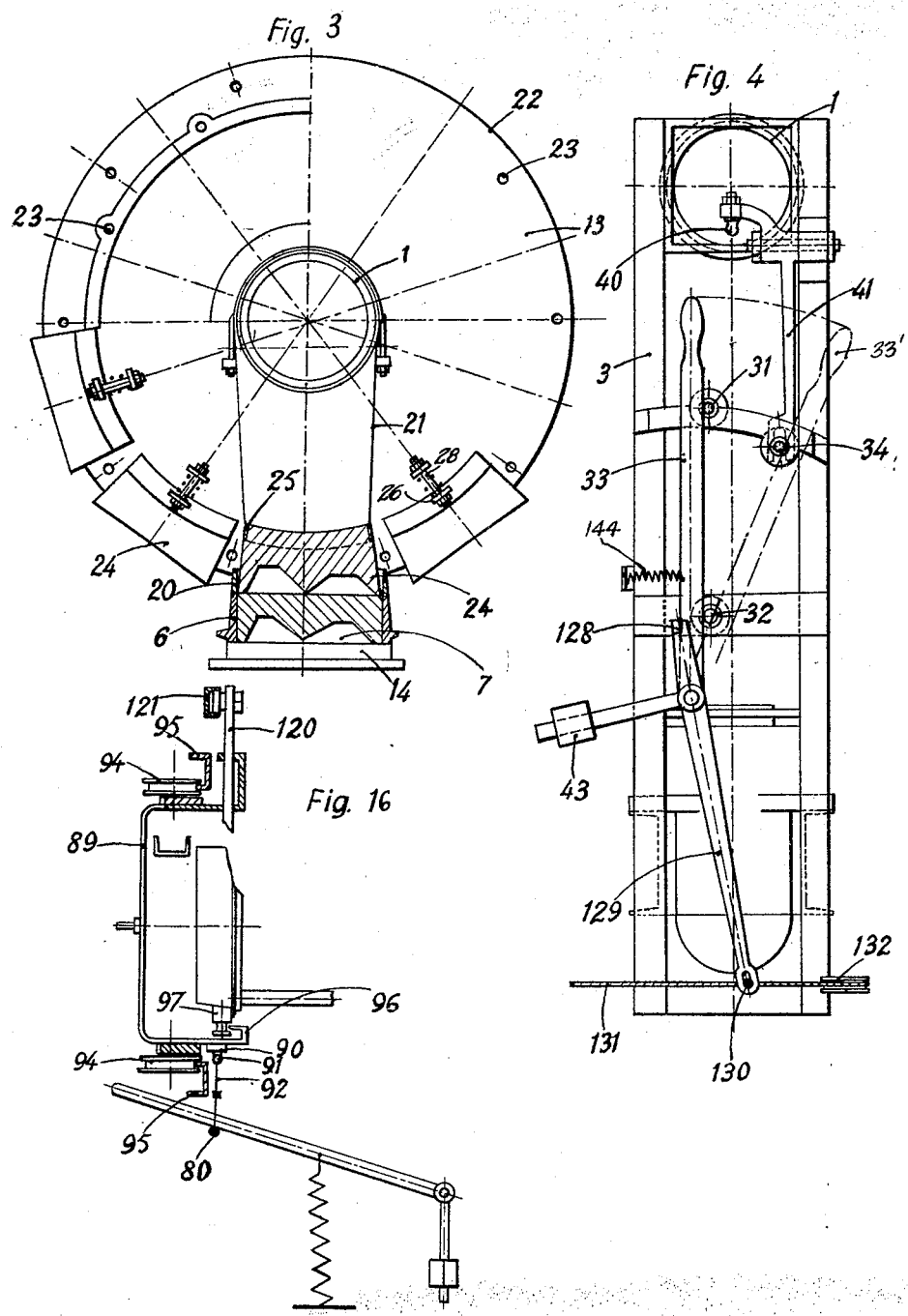

March 15, 1932. E. LEYONDRE 1,850,018
MOLDING MACHINE
Filed Aug. 16, 1929 9 Sheets-Sheet 5

E. Leyondre
INVENTOR

By: Marks & Clerk
Attys.

March 15, 1932.  E. LEYONDRE  1,850,018

MOLDING MACHINE

Filed Aug. 16, 1929   9 Sheets-Sheet 6

E. Leyondre
INVENTOR

By Marks & Clerk
Attys.

March 15, 1932. E. LEYONDRE 1,850,018
MOLDING MACHINE
Filed Aug. 16 1929 9 Sheets-Sheet 7
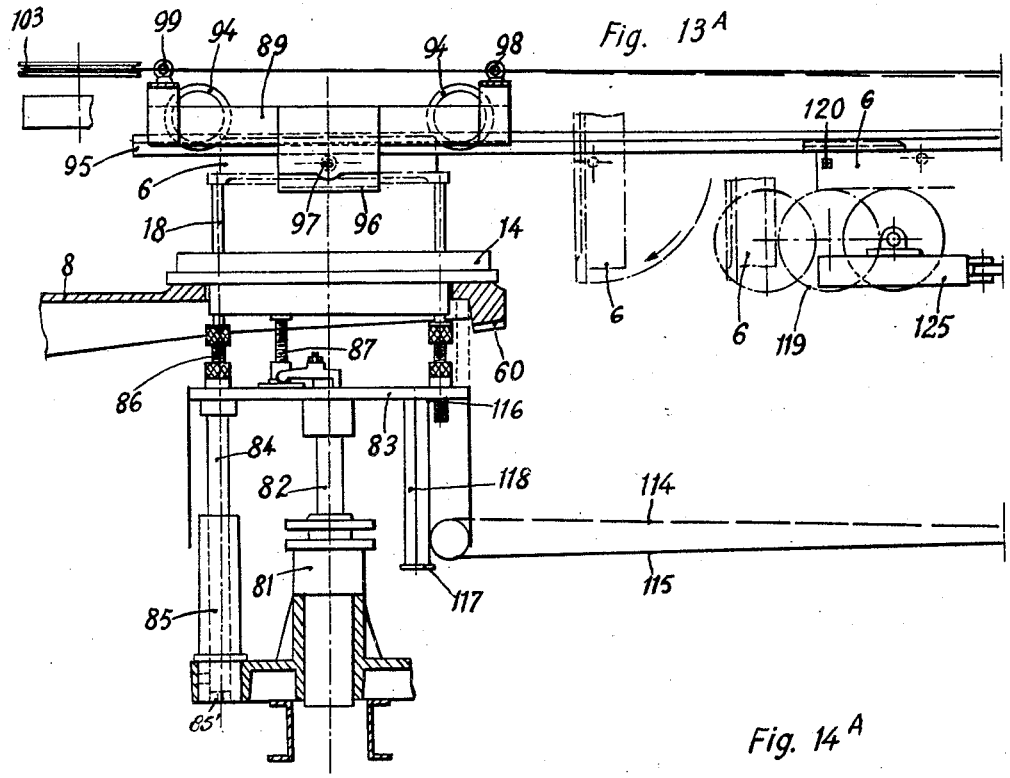
Fig. 13<sup>A</sup>
Fig. 14<sup>A</sup>
E. Leyondre
INVENTOR
By: Marks & Clerk
Attys.

March 15, 1932.  E. LEYONDRE  1,850,018
MOLDING MACHINE
Filed Aug. 16, 1929   9 Sheets-Sheet 8
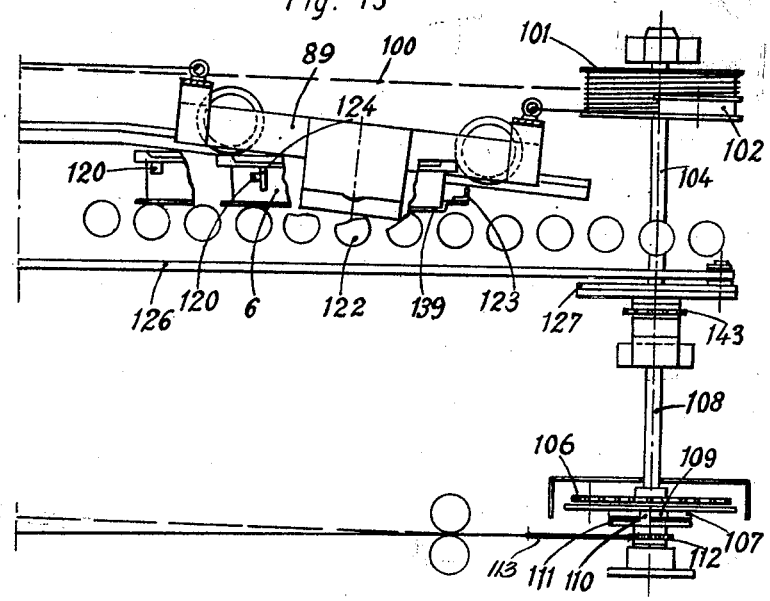
Fig. 13$^B$
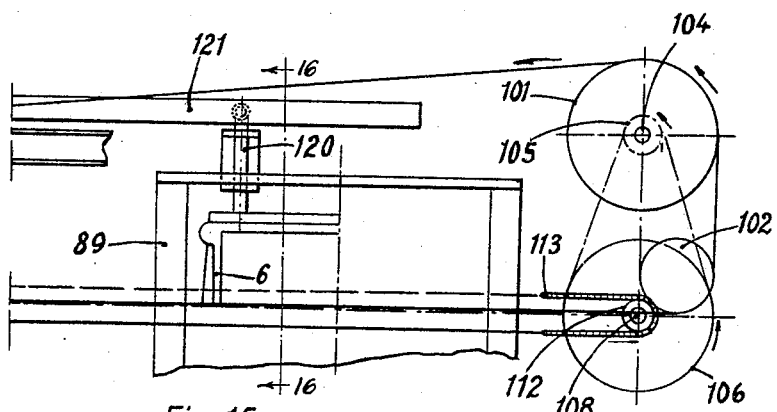
Fig. 14$^B$
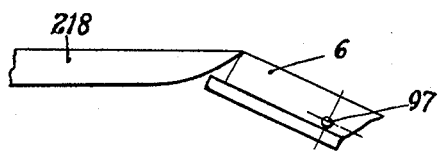
Fig. 15
E. Leyondre
INVENTOR March 15, 1932.  E. LEYONDRE  1,850,018
MOLDING MACHINE
Filed Aug. 16, 1929    9 Sheets-Sheet 9

E. Leyondre
INVENTOR

By Marks & Clerk
Attys.

Patented Mar. 15, 1932

1,850,018

UNITED STATES PATENT OFFICE

ETIENNE LEYONDRE, OF MONTBELIARD, FRANCE

MOLDING MACHINE

Application filed August 16, 1929, Serial No. 386,451, and in France August 28, 1928.

This invention has for its principal object a molding machine which shall permit the application of the so-called "chain" method of manufacture to the production of foundry molds.

"Chain" molding implies a series of molds in course of preparation, the various molding operations being effected for the same mold successively at different points in the chain and for all of the molds of the chain simultaneously.

As in general one would not consider multiplying each mold by the number of operations to be effected, which would necessitate two or more machines for a complete mold, one should have as many different molds as there are links in the chain.

It follows that for each pattern making a half-mold, it will be necessary to provide one mold pressure member per pressure and one pressure regulator per pressure, resulting in the necessity of providing a chain of mold pressure members, and a chain of pressure regulating devices.

The present invention is therefore characterized essentially by a molding machine comprising:—

(a) A chain of mold pressure members of special shape per pressure machine, located in the molding chain. This chain may correspond to the molding chain, or be independent thereof; it can be rectilinear or curvilinear, open or closed; and may be composed of elements of predetermined or in any position, and may have connected, or independent movements.

(b) A chain of automatic pressure regulating devices, equipping each of the pressure machines.

These two chains may be mounted on:—

(c) A molding, removal from molds, remolding, casting, discharging, etc. chain.

This chain may be rectilinear or curvilinear, open or closed, and have integral or independent elements as regards position and movement.

To these three chains may be added:—

1. A mechanism effecting automatically without the assistance of any motive agent other than the movement of the pressure plates, the advance and arrest of the molding chain, the advance of the mold pressure members and pressure regulators, and the locking and unlocking of the various chains, and of the control levers of the automatic mechanism for positioning the mold frames, for filling the pressing frames, for removal from the mold, remolding, casting and discharge of the molds.

2. Mechanism for simultaneously putting into action mechanism for positioning mold frames, pressing frames, removal from the mold, remolding, casting, and discharging.

3. An automatic sand distributing device per machine, delivering automatically to the mold to be pressed a suitable quantity of sand, which may be a constantly varying element.

4. A device for levelling the sand in the mold frame filled by the first sand delivery device.

5. A device for levelling the sand in the raised part of the mold frame filled by the second sand delivery device.

6. A device for levelling the sand in the frame pressed by the second machine.

7. A device for automatically removing the raised part of the mold frame (this support being subsequently secured to a support integral with the molding chain).

8. Mechanism for removing, turning and placing on a mold conveyor the part of the mold that is completed and removed from the mold operating automatically in combination with the mechanism for removing from the mold.

The purpose of these devices can be accomplished by the following mechanism, which will now be described in the course of the present specification; a device for removing from the mold, a remolding device, a casting mechanism, a discharging mechanism for removing the cast pieces and a sanding device.

The motive power used for operating the machine may be of any type, mechanical, hydraulic, pneumatic or electrical.

In order that the invention may be readily understood it will be described by way of example with reference to the accompanying drawings, in which:—

Figure 1 is a sectional view partly in elevation, of a molding machine adapted for chain operation, the chain comprising a circular rotary plate.

Figs. 2A and 2B together constitute a plan view of the circular plate used.

Figure 3 is a side view of the drum carrying the mold pressure members.

Figure 4 is a front view of an upright of one of the presses, showing the arrangement of some of the operating and actuating levers, taken from the left of Figure 1.

Figure 1:
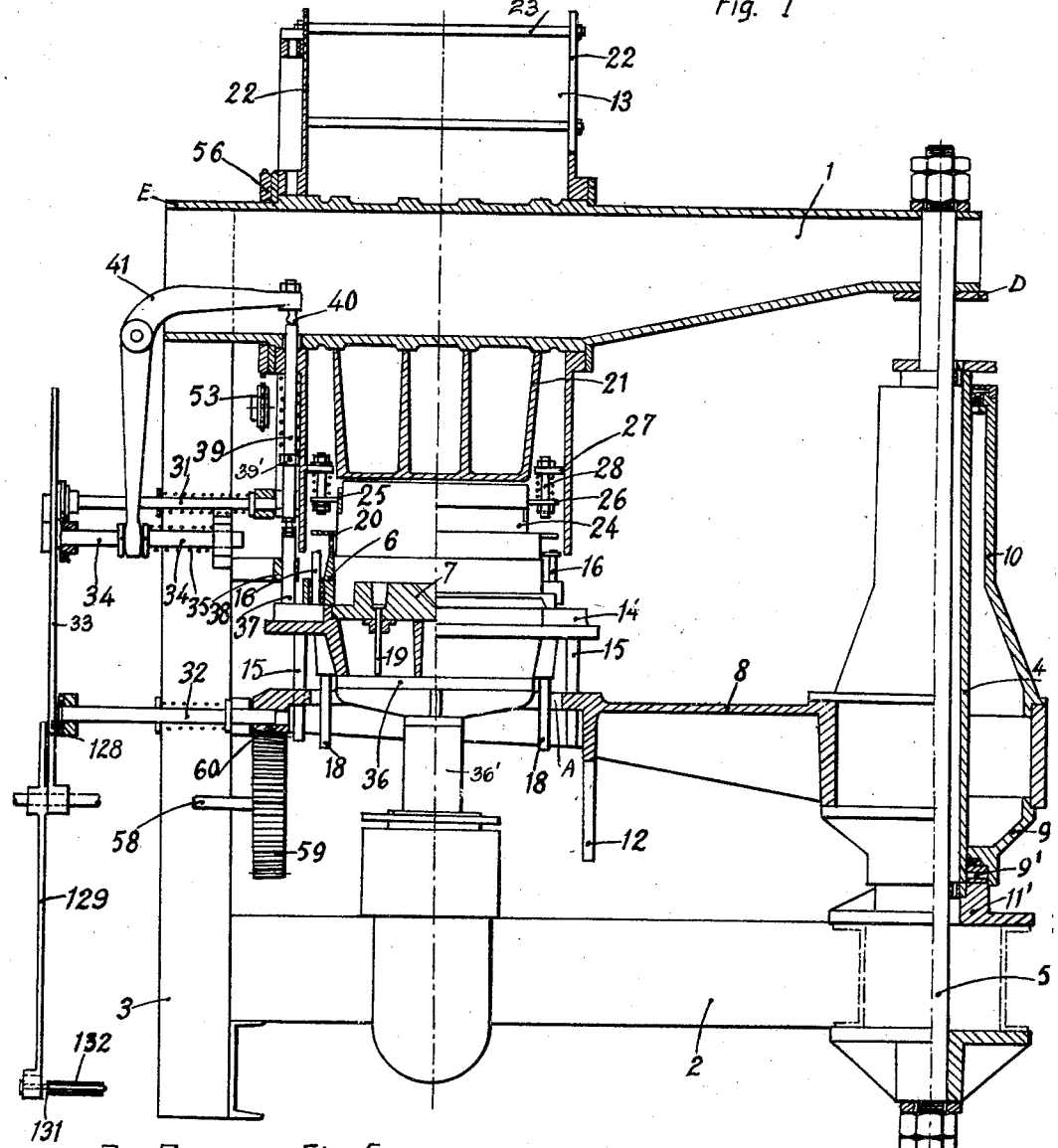
Figure 7:
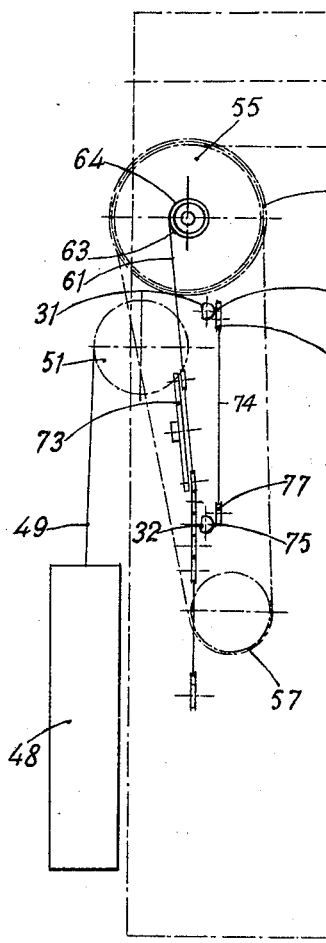
Figure 8:
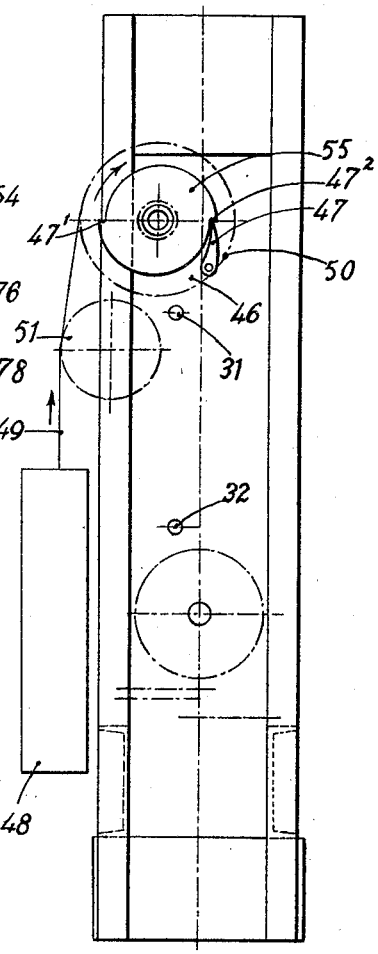
Figure 9:
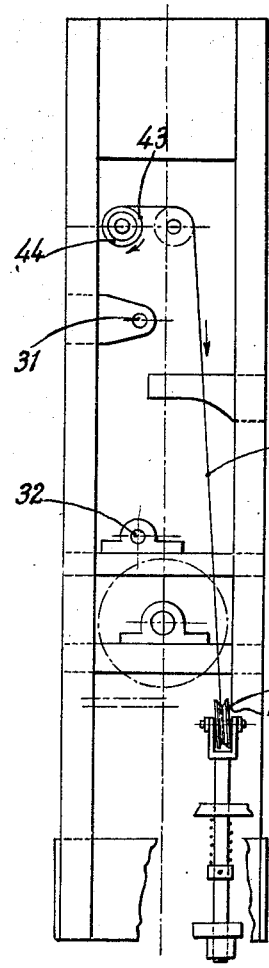

Figures 7, 8, and 9 are diagrammatic views similar to Figure 4, of one of the uprights (see Fig. 1) of one of the presses, illustrating the control parts, and the mechanical connections between the rotary table, the drum which carries the mold pressure members, and the pressure plates, shown in Figures 1 and 3 of the drawings.

Figure 10:
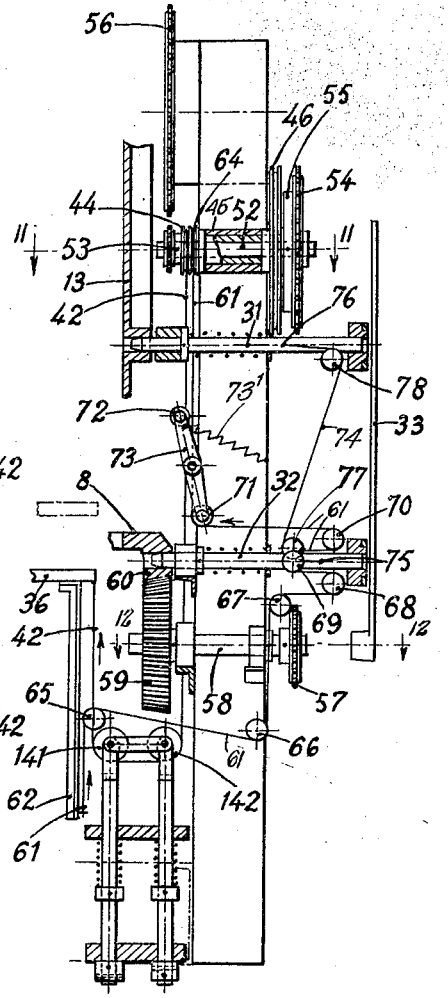

Figure 10 is a side elevation of an upright of one of the presses, showing operating apparatus taken on line 10—10 of Figure 2.

Figure 11:
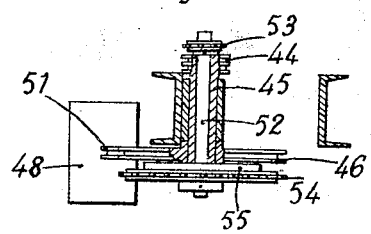

Figure 11 is a horizontal transverse detail section taken on line 11—11 of Figure 10.

Figure 12:
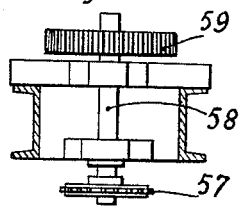

Figure 12 is a horizontal detail section on line 12—12, Figure 10.

Figs. 13A and 13B together illustrate the device in elevation for elevating the mold frame from the press and, its automatic removal from the same.

Figs. 14A and 14B together constitute a partial plan view of Fig. 13.

Figure 15 is a detail of a portion of the mold removal device.

Figure 16 is a transverse vertical section of the mold removal device on line 16—16 of Fig. 14.

Figure 17:
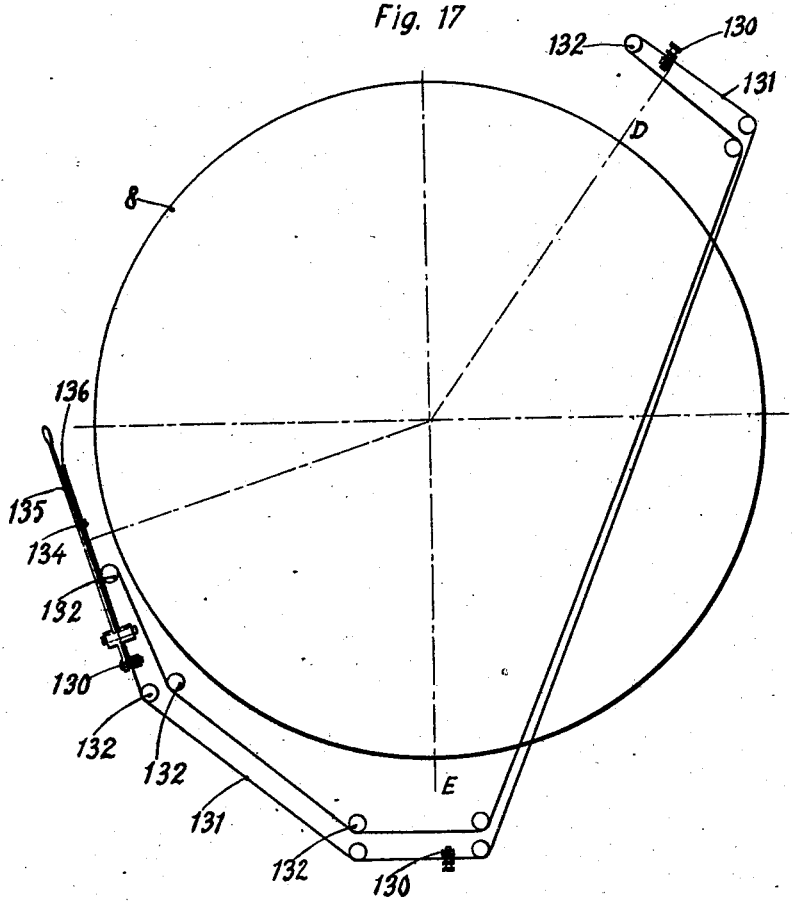

Figure 17 illustrates diagrammatically a control device having a single operating lever.

Figure 18:
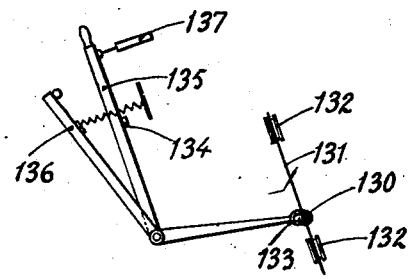

Figure 18 illustrates a detail of this mechanism in front elevation.

It being frequently difficult to obtain a perfect mold either by simple pressure, or by shaking followed by simple pressure, the molding machine described hereinafter has essentially for its object to permit the ready operation in a perfect manner, on one part of the mold, say by two consecutive pressures with mold pressure members specially adapted for the purpose, or by shaking followed by final pressure with mold pressure members of suitable shape.

The most interesting case will be described by way of example, because it is the most economical as regards motive power and because it presents the greatest flexibility as regards pressing the molds, which is to say, the case of two pressing machines.

The presses used are of the frame type, comprising two cross pieces, one upper piece 1 and one lower piece 2, connected by uprights 3, 4 and 5.

The uprights 4, 5 comprising a central shaft surrounded by a tube is common to the two presses which are arranged at a predetermined angle as seen in Fig. 2.

The two presses may be described as follows:—

The mold frame 6 mounted on a pattern-plate 7 is presented consecutively under each press by means of a conveyor, which may be of the roller or chain type (not shown) or a rigid type.

In the case in question the conveyor is of the rigid type and is constituted by a table 8 adapted to rotate in ball bearings about the tubular pivot 4 by means of its bosses 9 and 10. A ball abutment 9′ is interposed between the boss 9 and the socket 11′. Furthermore the supports 12 support the table 8 on a fairly large diameter.

The mold pressure members of suitable shape for each pattern-plate are mounted on a drum or barrel 13 adapted to rotate about the upper cross piece 1 of the machine.

When the molding machine is to be equipped so as to produce without dismounting the same, a certain number of molds, it will be necessary to have double the number of mold pressure members per barrel, for generally speaking each mold comprises two different parts requiring its mold pressure member to be of a shape suitable for the pattern.

The table 8 illustrated is evidently adapted to carry two sets of pattern-plates. In the case in question and as shown, the machine having to make 5 molds must be provided with ten pattern-plates. The table is provided with ten recesses A in each of which is located a pattern-carrying frame plate 14 which rests with its periphery on a corresponding seat on the table.

Two pins 15, 15, integral with the pattern-carrying frame plate 14 slide vertically in the table during the pressing operation or removal of the mold, and ensure the position of the frame plate. The frame plate 14 is provided with two iron pins 16 for directing and guiding the mold frame 6, a groove for the accommodation and seating of the pattern-plate 7 and four pins 18 for the mold removal operation of the mold frame 6.

A push rod 19 is provided in the pattern-plate 7. The mold frame 6 receives for the final pressure a raised part 20.

The fixed abutment 21 of the machine is secured under the cross piece 1. The barrel 13 is composed of two flanged members 22, the distance apart of which is maintained by ten cross pieces 23. Between these flanged members ten formers 24 are located, each mounted in a frame 25, provided with ear pieces 26 permitting of their being suspended by guide bolts 28, which in turn have springs and shoulder pieces which are suspended from corresponding ear pieces 27 formed integral with the flanges 22. The frame 25 can then slide on the guide bolts 28, the lower ends of which limit when at rest the position of the mold pressure member at about 5 mm. from the abutment 21, the necessary distance being maintained by the springs surrounding the guide bolts. The phase of the molding operation which includes the pressing is executed in two operations, and evidently comprises two fillings of sand as follows:

1. A smooth filling of the mold frame 6 is obtained by means of an automatic sand distributor B, Fig. 2, giving with a small excess, the amount of sand required. The sand is subsequently levelled automatically.

2. A smooth filling of the raised part 20 is obtained by an automatic sand distributor at C giving with a small excess the necessary amount of sand.

The sand having been levelled automatically, there is only presented under the press or on a shaking machine one frame containing the same pattern-plate, contrary to what is generally the case with other machines comprising a preparatory pressing executed by hand or by mold-pressure member. In the latter machines the said preparation often comprises the greater part of the pressing operation of the sand.

The intensity of the pressing of the sand is always the same for a predetermined regulation of the machine effected by the overseer; this regulation can, however, be modified at any time if considered necessary.

The essential operations of pressing the sand, and of mold removal simultaneously on different chains, determine the period of stopping of the molding chain which advances a step $1/2n$ (1/10 in the case in question) at each of its displacements.

The scheme of operation is as follows (Fig. 2).

At point I positioning of part of the mold frame 6 on the pattern-plate 7. This operation however does not necessitate a stopping period, and is made at any moment at the choice of the operator who must also assure himself of the cleanliness and normal condition of the mold pressure members which arrive at their point of greatest elevation thereat, and sprinkle insulation material adequate for the manufacture in question.

All this can be effected between the phases X and II.

At II filling the frame 6 from the distributor B with a small excess of sand.

Between points II, III and at III, any additional operations may be carried out which may be required for a particular pattern, whilst for ordinary moldings no operation is effected.

After III and between III and IV the excess sand is removed by a scraper (not shown).

At IV the mold frame is subjected to a first pressure by the press D.

At V and between IV—V, V—VI a second workman scrapes the false joint of the first pressing, if this is considered advisable, places in position the raised part 20 and the runner heads if necessary and eventually the upright guide bearings.

At VI the raised part 20 is filled with a small excess of sand from a distributor located at C (not shown) similar to distributor B.

Between VI and VII and at VII any exceptional operation may be carried out; normally no operation is effected.

Figure 6:
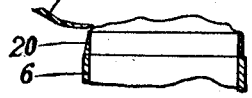

Between VII—VIII after leaving VII, the excess of sand is levelled by another scraper 140 (see Fig. 6).

At VIII a second pressure by the press E is made.

Figure 5:
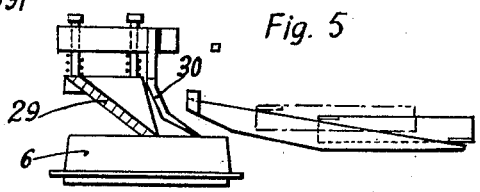
Figure 5 and 6 are details in side view of some of the sand scraping and levelling devices used.

Between VIII and IX and between IX and X the raised part 20 is automatically removed, and the excess of pressed sand levelled by a scraper 29 preceded by a projecting part 30 (see Fig. 5).

Between IX and X the cleaning of the whole mold is effected automatically by strikers (not shown) controlled by the table 8.

At X the finished part of the mold frame is removed from the mold and taken by a special carriage which ensures its being turned into an inverted position, before depositing it on a mold conveyor for removing it from the molding machine the operation of which will be described in detail hereinafter.

It is evident that a pattern plate is required for each mold, per turn of the table, and that a multiplicity of patterns is required for use in connection with a table of the kind in hand, and accordingly a barrel or drum carrying a plurality of such patterns is used in the present invention, as will be described hereinafter.

The pressing of a mold frame 6 cannot be effected before the table 8 and barrel 13 are duly secured in a locked position with reference to the mold pressing machines used, which will also be described herein.

The locking bolts 31, 32 (Figs. 1 and 10) being in place, it is possible to operate the lever 33 to bring it to the position 33' indicated in dotted lines in Figure 4. In this movement the lever, owing to the inclined part formed on same and to the corresponding inclined part at the end of a bolt 34, pushes back the said bolt which is pushed inwardly during the passage of the lever but returns immediately under the action of a return spring 35.

With the bolts 31 and 32 in locked position (see Fig. 1) the lever 33 may be released, and the table 8 and the barrel carrying the mold pressure members are securely locked with relation to the upright 3 of the pressing machines. During the position of locked control of the apparatus just described, the piston 36' can be raised to perform the pressing operation on the molds. Accordingly the press plate 36 then rises, and raises the whole apparatus formed by the frame plate carrier 14, the pattern-plate 7, the mold frame 6 and the raised part 20. The latter then encounters the mold pressure member 24, which in turn rises against the action of its springs and engages itself almost immediately under the fixed abutment 21, and thus the sand in the mold frame is pressed.

Whilst the whole apparatus 14—7—6—20 rises, the frame plate carrier 14 touches and raises the push rod 37 sliding in a support 38 integral with the support 3 which in turn cooperates with a second push rod 39 of a length suitable for the mold to be pressed and otherwise controllable. The push rod 39 in turn cooperates with the end 40 of a bent lever 41 which acts on the bolt 34 against the action of its spring 35 thus releasing the control lever 33 which, under the combined action of a spring 144 and of a return counterweight 43, returns to its initial position corresponding to the return of the pressure piston 36' to its lowest initial position.

The push rod 39 slides in two supports and a ring 39' limits its lower position; a weak spring cooperating with said ring holds it at rest. A push rod 39 of suitable length is provided for each pattern-plate. This push rod mounted radially on the right hand side of the corresponding mold pressure member places itself in a readily operative position at the same time as the latter. The lower end of the push rod 39 comprises a device whereby its length may be adjusted so as to provide for the necessary adjustments to ensure perfect operation of its function in accordance with the variations of the varying mixtures of sand which may be used in the mold frame.

The principle of automatic and regulated stopping of the pressing operation is very important because it insures smooth operation of the device independent of the operator.

The method of "pressing" the mold is effected in the same way on the presses D and E (Fig. 2) with or without the raised part 20.

When there are very high parts in the mold frame comprising a deep hollow pattern, it is possible if insufficient pressure is not to be feared, to replace the press D by a shaking device.

In this case it suffices to mount some strikers (apparatus not shown) laterally and under frame plate carrier 14 which by an inclined cam of suitable form, raise the said frame and allow it to fall again gradually on to the shaking plate, at the same time leaving it raised with relation to the table 8.

For operating the barrel 13, the table and the bolts, the movement of the pressure pistons 36' is utilized (Figs. 1, 2, 7 to 10).

For controlling the barrel a cable 42 is employed attached at one end to the piston 36' and at the other end to a point on a pulley 44 (Fig. 10). The cable 42 passes over tightening and return rollers 141—142. The pulley 44 is operatively connected by a hollow shaft 45 with a pulley 46; a pawl 47 is pivotally mounted on the pulley 46. A counterweight 48 is suspended by a cable 49 from the pulley 46, the end of this cable stopping at 50 after having passed over a guide pulley 51. The shaft 52 passing inside the hollow shaft 45 is provided at its ends with a pinion 53 and with a pinion 54 integral with a ratchet wheel 55. The pinion 53 cooperates by means of an endless chain (not shown) with the pinion 56 integral with the barrel 13.

The pinion 54 cooperates by means of an endless chain (not shown) with the pinion 57 secured to the shaft 58, on which is secured the conical pinion 59 engaging with the toothed crown wheel 60 of the table 8.

When the piston 36' rises, the cable 42 and consequently the pulleys 44 and 46 as well as the cable 49 and the counterweight 48 are moved in the direction of the arrows. The pawl 47 passes from its position at 47' to a position always beyond $47^2$, in spite of the different values that the stroke of the piston 36' may have; in other words, for a minimum stroke of the piston, the pawl 47 passes by a small amount the position $47^2$.

Upon the descent of the piston 36, the cable 42, pulleys 44 and 46, cable 49 and the counterweight 48 return in the reverse direction until the pawl 47 engages in one of the two diametrically opposite notches $47^1$—$47^2$ of the ratchet wheel 55. The ratchet wheel 55 being operatively connected by the pinions 53—56, 54—57, 59 and 60 with the barrel 13 and the table 8 which are both locked by the bolts 31—32 respectively, cannot turn, and thus cause the arrest of the return movement of the pulleys 44—46, the cable 49 and counterweight 48. The cable 42 then tends to become slack but is prevented by the spring slack adjusters 141—142. Towards the end of the stroke of piston 36' when it is disengaged from the table 8, the bolts 31—32 are disengaged, thus liberating the barrel 13 and the table 8, which are then subjected merely to the action of the counterweight 48. At once upon the disengagement of the bolts 31—32, the table 8 and the barrel 13 rotate $$\frac{1}{2n}$$

of a complete turn. The rotation is limited automatically by the return of the bolts 31—32 into the following holes corresponding to another phase of the work, for they have been rendered subject to the action of their respective springs during the rotation of the table, and of the barrel.

It is of advantage to provide an air brake (not shown) actuated by the counterweight at the end of the stroke to avoid any great shock.

During the rotation of the table and of the barrel, the ratchet wheel 55 makes a half turn which always places it in the stopping position.

The movements of the bolts 31—32 are effected as follows: A cable 61 is attached at one end to a support 62 fixed under the piston 36′ and, at the other end to a fixed point 63 of a pulley 64 connected to the pulley 44. The cable 61 passes over the return rollers 65, 66, 67, 68, 69, 70 and the return and tension rollers 71, 72 mounted on a pivoted lever 73 having a tension spring $73^1$ (Fig. 10). The shafts of the rollers 65, 66, 67, 68 and 70 are fixed, whilst that of roller 69 is integral with the bolt 32. A cable 74 is secured at its ends at 75 to the bolt 32 and at 76 to the bolt 31 passing over the return pulleys 77, 78 rotating on fixed axes.

Upon the piston 36′ rising, the cable 61 winds up on the pulley 64 by the same amount as is released by the ascending movement (see the direction of the arrows) so that nothing is effected. Upon the descent of the piston, that is to say, in the reverse direction nothing takes place, until the moment when the return movement of the counterweight 48 is arrested by the pawl 47 abutting against one of the notches in the ratchet wheel 55. At this moment the pulley 64 no longer turns and does not pay out any more cable 61 to follow the descent of the piston 36′, so that the released portion of the cable 61 is shortened and then carries back the roller 69 and bolt 32 on which it is mounted, and this against the action of the return spring.

The disengagement of the bolt 32 from table 8 causes the same automatically to be withdrawn from the bolt 31 of the barrel 13, owing to the action of the cable 74 which connects them.

As the counterweight 48 redescends, the pulley 64 lets the cable 61 unwind, which permits the bolts 31 and 32 under the action of their springs to abut against the rim at the periphery of the table 8, and the barrel 13, so as to be ready to enter the next corresponding holes which the rotation of the table and of the barrel bring in front of the bolts. During the fall of the counterweight 48 and until the entrance of the bolts 31, 32, the slack of the cable is taken up by the slack adjusting pivoted lever 73.

The invention also comprises a series of mechanisms and devices for effecting the removal of the mold, and the automatic raising of part of the mold frame from the molding machine.

In order to effect the removal from the mold a lever 136 is pushed down and automatically held stationary by means of a spring bolt 80. The fluid supplied to the cylinder 81 causes the piston rod 82 surmounted by a plate 83 to rise. The plate 83 is guided by two stems 84 sliding in cylinders 85 constituting guides. The plate 83 is provided on its upper face with four abutments or adjustable supports 86, and with a number of push rods 87. The supports and push rods simultaneously cooperate with the corresponding pins or stems 18 and 19 (Fig. 1), adapted to slide in the frame plate carrier 14, and in the pattern plate. The spindles 18 raise the mold frame 6 upwards and are provided with projections (not shown) arresting them in their descent at the level of the pattern-plate and frame plate carrier 14, that is to say, under said frame.

To limit the course of upward travel of the mold frame from the machine the carriage 89 intended to receive the mold frame, is provided with a pin 90 which, towards the end of its stroke, abuts against a projection of the guide rod 91, so that this projection draws the rod along, which, by means of the pivoted lever 92 having return spring $92^1$ and two connecting rods 93, 93′, in turn displaces the bolt 80 to the right (Fig. 14) so as to release the lever 136, which returns automatically to its original position aided by a spring, and a counterweight (not shown). This movement of lever 136 thus empties the cylinder 81 causing the descent of the plate 83 and of the spindles 18 (Figure 1) which fall by their own weight.

The braking of the upward and downward movement of the piston 82 is effected as follows:—

The rods 84 comprising segments at their lower ends and the cylinders 85 whilst being closed at the bottom, are pierced with a small adjustable aperture 85′ which ensures braking when removal from the mold commences and at the end of the return stroke of the piston. Ports (not shown) suitably arranged at a convenient distance from the bottom of the cylinders, also stop the braking at a suitable time.

Part of the emptied frame 6 is raised automatically over the spindles 18 and placed on a conveyor of some type in the following manner:—The carriage 89 is supported by four flanged rollers 94 (shown clearly in Fig. 16) on two parallel rails 95 the profile of which in elevation is composed of a horizontal part followed by a part inclined downwardly on a 10% slope. The carriage 89 is provided with two supports 96 each provided with a notch for accommodating a trunnion 97 of the mold frame 6. The supports 96 are provided of a size which is predetermined so as to guard against a possible slight irregularity of movement at the stopping position of the carriage.

The carriage 89 is attached at 98 and 99 to the two ends of a cable 100 wound several times to obtain the necessary adherence on a controlling drum 101, and passing over return rollers 102, 103. This controlling drum 101 is secured to a vertical shaft 104 connected with a pinion 105 which receives its movement from a chain on a pinion 106 secured to a sleeve 107 idle on a shaft. The sleeve 107 is provided at its periphery with a notch 109 in which is constantly seated the tenon 110, carried by a plate 111 integral with a chain pinion 112 secured to the shaft 108.

Over the pinion 112 a chain 113 passes, the two ends of which are attached to cables 114, 115 connected on the other hand at 116 to the piston plate 83 and at 117 to a support 118 integral with said plate.

Figures 13 and 14 show the installation at the precise moment when the carriage 89 attains its high dead point and releases by means of its projection 90 the necessary mechanism for releasing the lever 136 and placing the cylinder 81 in its position for evacuation.

The piston 82 being caused to descend as well as the spindles 18 and the mold frame 6, the latter after a stroke of about 10 m/m. comes to rest with its trunnion 97 on the supports 96 integral with the carriage 89. During this stroke the descent of the piston 82 exerts an even traction on the cable 114 so as to cause the rotation of the pinion 112 and consequently of the shaft 108. But owing to the circumferential play of the tenon 110 integral with the plate 111 in the notch 109 this tenon 110 is merely displaced in the notch without coming in contact with the opposite entraining surface. Only when the frame 6 rests with its trunnions 97 on the supports 96, the spindles 18 having left it, does the tenon 110 again cooperate with, but in the reverse direction, the mortise 109, then drawing along in the direction of the arrows the sleeve 107 idle on the shaft 108, the pinion 106 connected by a chain to pinion 108 which is then entrained as well as shaft 104, the drum 101, and through the cable 100, the carriage 89, in the interior of which the mold frame 6 is placed.

As soon as the mold frame 6 is moved from the table 8 it is supported solely by its trunnions 97 in the supports 96 of the carriage 89. Its oscillation on its trunnions is at first prevented by a guide 218 (Figs. 15, 13 and 16) and then is effected automatically, owing to a longitudinal eccentricity of the said trunnions on the mold frame (a very slight eccentricity and which must not be annulled, but on the contrary increased) by placing the pattern-plate suitably on the mold frame so that the mass of sand in the mold frame is always greater at the side where it is desired that the oscillation shall take place.

The carriage 89 and the frame 6 having oscillated as shown in Figure 13, they continue their course on the rails 95. The frame 6 abuts against the periphery of a rubber drum 119 which is then placed in an intermediate position by a mechanism which will be described later. This encounter of the frame 6 with the roller 119 forces it to continue its rotation on its trunnions so as to complete its half turn and place itself in the horizontal position, but reversed in relation to that which it occupied upon leaving the table. A rod 120 which can slide in a support of the carriage 89 is controlled by an inclined ramp 121 so as to engage under the lateral grooving of the frame 6 with the object of limiting the reversal or descent of the same which will be stopped when it leaves the drum 119. The frame 6 is thus stopped after a small descent in a position inclined about 9 per cent to the rear. As the carriage 89 continues to descend the inclined part terminating the rails 95 and which is a 10 per cent slope, it follows that the frame 6 leaves the said carriage on account of disengagement from its trunnions, after having been placed flat on a plate 139 placed in readiness on the mold conveyor 122 which, in the case in question, is a series of rollers arranged on an incline of 1%. In order to obviate the difficulty of placing the frame 6 exactly on the plate 121 the same is provided with a front projection 123 which the front end of the frame abuts against, and entrains before placing itself flat. The entrainment of the frame 6 by the carriage 89 ceases as soon as the trunnions 97 have escaped from the necks of the supports 96, to be taken up again shortly after on account of the rod 120 which abuts against a small vertical groove 124 of the frame provided for this purpose.

The entrainment of the frame 6 by the carriage 89 does not therefore definitely cease until the end of the downward course of said carriage.

The mechanism is then ready for the ascent of the carriage as soon as the controlling levers of the mold removing device are suitably operated. As it ascends the carriage 89 could not engage by its supports 96 the trunnions 97 of the mold frame previously placed on the conveyor 122, because even if the said mold frame had not continued its forward movement under the double influence of the impulse received, and the slope of the conveyor, it will have been sufficiently moved by the supplementary thrust due to the rod 120.

The upward movement of the carriage 89 takes place during the ascending stroke of the piston 82 and the mechanism described above operates in the reverse direction of the arrows but in a similar manner to that described for the descent of the carriage.

In order to avoid the dislocation of the mold occasioned by impact of the frame 6 against the drum 119, the same has been mounted on a small carriage 125, energized by an alternative movement due to a connecting rod 126 actuated by a crank-plate 127 integral with the chain pinion 143 idle on the shaft 108 and controlled by the shaft 104. The variable speed of the carriage 125 and the lowering of the control are so regulated that the frame 6 comes in contact with the drum 119 in a middle position of the same, that is to say as soon as the speed of the drum passes its maximum and redescends. In this manner the frame 6, almost in contact with the drum, is allowed to catch up with a very small difference in speed; the shock is thus reduced to a minimum which is not prejudicial to the mold.

In Figure 17 an embodiment is illustrated in which, by means of a single lever, the machines giving the pressure and the removal from the mold are controlled. The other apparatus heretofore described controlling the operation of the drum 13 and the table 8 can be connected in the same way to the said general control.

An endless cable 131 is placed around a predetermined number of rollers 132. On the cables 131 three entrainment fingers 130 are arranged which can engage in the oval eye of three levers, one 135 of which is arranged on the right of the device for mold removal, whilst the other two 129, (Figures 1 and 4) are each mounted on the right of one of the two pressing machines. These levers can turn freely on their respective axes. The lever 135 is provided with a pin 134 permitting it to move the control lever 136 of mechanism for removal of the mold, in one direction only.

Each of the levers 129, is provided with a squared projection 128 permitting it to move in the same way, the lever 33 controlling the corresponding pressing machine. The lever 135 is operable by means of a handle and acts as a single lever, ensuring the operation of the various controlling levers. A counterweight 137 returns the lever 135 to its initial position as soon as it is released. The operator raises the lever 135, which with its projection 134 moves the lever 136, and simultaneously as the end 133 of the lever 135 is engaged on a finger 130, the cable 131 is also moved, and consequently the levers 129, which themselves in turn actuate by means of their projections 128, the levers 33 (Figure 4). The movement of the levers 136 and 33 is sufficient to place them in their locked stopping position. At this moment the operator releases the lever 135 which, aided by its counterweight 137 again takes up its initial position, in which it is no longer operatively connected with the levers 136 and 33 so that each machine can be operated at any desired time independently when desired. This control of the molding machine by a single lever has the advantage of requiring only one workman, who may at the same time put in place the empty frames, raise the runner heads, and supervise the removal of the molds; moreover, the various apparatus are rendered independent in operation as soon as they are in action.

It will be evident that although in the present instance a three lever control machine is shown (by way of example only), in Figure 18, all the other auxiliary apparatus for positioning the empty frame, for filling it, removing from the mold, casting, and discharging may be actuated in the same way by the single lever having general control.

It will be well understood that the number of the pressing machines, disposed in the molding chain, may be increased or diminished according to the necessities and that the machine can be used for the making of the cores, in the same way as for the making of the molds, by merely making some modifications.

Claims:

1. In a molding apparatus, a pair of pressing machines, mounted at a predetermined angle in relation to each other, a central upright member common to both presses, an upper and a lower cross-piece for each pressing machine mounted on the central upright, an outer upright for each machine, located at each outer extremity of the cross-pieces, a frame plate carrier for each machine, adapted to support a mold flask, a fixed pressure abutment on each upper cross-piece, a revoluble drum on each upper cross-piece, a plurality of mold pressure members on each machine carried by the revoluble drums, each adapted to engage a mold flask, for the purpose of pressing the sand into place within the mold, and automatically controllable means for pressing the frame plate carrier and the fixed pressure abutments to each machine toward each other.

2. In a molding machine, a pressing machine comprising a central upright, an upper and a lower cross-piece on the central upright, a rigid outer upright rigidly mounted on the ends of the cross-pieces, a revoluble table mounted on the central upright having a press plate aperture therethrough, a press plate and means for reciprocating same, located in the table aperture, a frame plate carrier on the press plate adapted to receive a pattern plate, a mold frame and a raised part adapted to engage on the top of the mold frame, a fixed pressure abutment mounted on the upper cross-piece, a revoluble barrel mounted on the upper cross-piece, a plurality of mold pressure members on the revoluble barrel, each adapted to be swung into position above the mold frame, and beneath the fixed pressure abutment, means for controlling the upward travel of the press plate, and means for locking the revoluble table, in relation to the outer upright of the pressing machine, and means for locking the revoluble barrel in position during a mold pressing operation.

3. In a molding machine, a pressing machine comprising a central upright, an upper and a lower cross-piece on the central upright, a rigid outer upright rigidly mounted on the ends of the cross-piece, a revoluble table mounted on the central upright having a press plate aperture therethrough, and a locking bolt recess therein, a press plate, and means for reciprocating same, located in the table aperture, a frame plate carrier on the press plate adapted to receive a pattern plate, a mold frame and a raised part adapted to engage on the top of the mold frame, a fixed pressure abutment mounted on the upper cross-piece, a revoluble barrel mounted on the upper cross-piece, a plurality of mold pressure members on the revoluble barrel, each adapted to be swung into position above the mold frame, and beneath the fixed pressure abutment, a table locking-bolt mounted on the outer upright member, adapted to engage the locking bolt recess of the revoluble table for locking same in position, a locking bolt for locking the revoluble barrel in fixed position, a bent lever revolubly mounted intermediate its length on the outer upright, a push rod in engagement with the bent lever, and adapted to be operated by the frame plate-carrier, means for automatically limiting the travel of the press plate, when the bent lever is actuated by the action of the mold pressure member and the push rod, and means for disengaging the locking bolts of the revoluble table and the revoluble barrel after a pressing operation.

4. In a molding apparatus, a pair of pressing machines for sequential pressing operations of molds, mounted at a predetermined central angle in relation to each other, a fixed central upright post common to both machines, a mold supporting table having a plurality of press plate apertures therethrough, and adapted to revolve about the central post for carrying a number of molds during a sequential chain of hand and machine operations, each pressing machine comprising the following parts, an upper and a lower cross-piece mounted on the central upright, a fixed outer upright connecting the outer ends of the cross-pieces, a press plate and pressing means therefor, positioned in a table aperture, a frame plate carrier on the press plate adapted to receive a pattern plate, a mold frame, and a raised part adapted to engage on the top of the mold frame, a fixed pressure abutment mounted on the upper cross-piece, a revoluble barrel mounted on the upper cross-piece, a plurality of mold pressure members on the revoluble barrel, each adapted to be swung into position above the mold frame, and beneath the fixed pressure abutment, means for controlling the upward travel of the press plate, and means for locking the revoluble table, in relation to the outer upright of the pressing machine, and means for locking the revoluble barrel in position during a mold-pressing operation.

5. In a molding apparatus, a pair of pressing machines for sequential pressing operations of molds, mounted at a predetermined central angle in relation to each other, a fixed central upright post common to both machines, a mold supporting table having a locking bolt recess therein, and having a plurality of press plate apertures therethrough, mounted on and adapted to revolve about the central post for carrying a number of molds during a sequential chain of hand and machine operations, each pressing machine comprising the following parts, an upper and lower cross-piece mounted on the central upright, a fixed outer upright connecting the outer ends of the cross pieces, a pressed plate and pressing means therefor, positioned in a table aperture, a frame plate carrier on the press plate adapted to receive a pattern plate, a mold frame, and a raised part adapted to engage on the top of the mold frame, a fixed aperture abutment mounted on the upper cross-piece, a revoluble barrel mounted on the upper cross-piece, a plurality of mold pressure members on the revoluble barrel, each adapted to be swung into position above the mold frame, and beneath the fixed aperture abutment, a table locking bolt mounted on the outer upright member adapted to engage the locking bolt recess of the revoluble table for locking the same in position, a locking bolt for locking the revoluble barrel in position, a bent lever revolubly mounted intermediate its length on the outer upright, a push rod in engagement with the bent lever, and adapted to be operated by the frame plate carrier, means for automatically limiting the travel of the press plate when the bent lever is actuated by the action of the mold pressure member and the push rod, and means for disengaging the locking bolt of the revoluble table and the revoluble barrel after a pressing operation.

6. In a molding apparatus, a pair of pressing machines for sequential pressing operations of molds, mounted at a predetermined central angle in relation to each other, a fixed central upright post common to both machines, a mold supporting table having a plurality of press plate apertures therethrough, and adapted to revolve about the central post for carrying a number of molds during a sequential chain of hand and machine operations, each pressing machine comprising the following parts, an upper and a lower cross-piece mounted on the central upright, a fixed outer upright connecting the outer ends of the cross-pieces, a press plate and pressing means therefor, positioned in a table aperture, a frame plate carrier on the press plate adapted to receive a pattern plate, a mold frame, and a raised part adapted to engage on the top of the mold frame, a fixed pressure abutment mounted on the upper cross-piece, a revoluble barrel mounted on the upper cross-piece, a plurality of mold pressure members on the revoluble barrel, each adapted to be swung into position above the mold frame, and beneath the fixed pressure abutment, means for controlling the upward travel of the press plate, and means for locking the revoluble table, in relation to the outer upright of the pressing machine, and means for locking the revoluble barrel in position during a mold-pressing operation, in combination with a device for removing the mold frame from the pressing machine, and loading same in an inverted position on a mold conveyor, comprising a pair of parallel fixed carriage supporting rails, the ends of which extend over the mold frame, a frame carrying carriage having revoluble means for traveling along the fixed rails, a pair of opposed trunnion supports on the carriage, a pair of opposed trunnions on the mold frame adapted to be engaged by the said trunnion supports, means for operating the carriage and the mold frame along the fixed rails, and means for inverting and discharging the inverted mold frame on the mold conveyor.

7. A molding apparatus as in claim 2, in combination with a device for removing the mold frame from the pressing machine, and loading same in an inverted position on a mold conveyor, comprising a pair of parallel fixed carriage supporting rails, the ends of which extend over the mold frame, a frame carrying carriage having revoluble means for traveling along the fixed rails, a pair of opposed trunnion supports on the carriage, a pair of opposed trunnions on the mold frame adapted to be engaged by the said trunnion supports, means for operating the carriage and the mold frame along the fixed rails, and means for inverting and discharging the inverted mold frame on the mold conveyor.

8. A molding apparatus as in claim 2, in combination with a device for removing the mold frame from the pressing machine, and loading same in an inverted position on a mold conveyor, comprising a pair of parallel fixed carriage supporting rails, the ends of which extend over the molded frame, a frame carrying carriage having revoluble means for traveling along the fixed rails, a pair of posts, trunnion supports on the carriage, adapted to hold the mold frame in an eccentrically loaded position, a pair of opposed trunnions on the molding frame adapted to be engaged by said trunnion supports, means for operating the carriage and the mold frame along the fixed rails, means for inverting the mold frame on its trunnions while same is in the carriage, comprising a shock absorbing roller adapted to resiliently engage the eccentrically loaded mold aperture during its travel along the fixed rails and inverting the same, means for reciprocating the roller, and means for discharging the mold frame on the conveyer comprising an inclined portion formed on the fixed carriage supporting rails, an inclined ramp fixedly mounted in proximity with the mold frame, a braking rod in engagement with the ramp and the mold frame for breaking the speed of travel of the mold frame, a receiving plate on the mold conveyor having a front projection adapted to engage the mold frame, and gradually position the same on the mold conveyer.

9. In a molding machine, a pressing machine comprising a central upright, an upper and a lower cross-piece on the central upright, a rigid outer upright rigidly mounted on the ends of the cross-piece, a revoluble table mounted on the central upright, having a press plate aperture therethrough, a press plate, means for reciprocating the same, located in the table aperture, a frame plate carried on the press plate adapted to receive a pattern plate, a mold frame and a raised part adapted to engage on the top of the mold frame, a fixed pressure abutment mounted on the upper cross-piece, a revoluble barrel mounted on the upper cross-piece, a plurality of mold pressure members on the revoluble barrel, each adapted to be swung into position above the mold frame, and beneath the fixed pressure abutment, means for controlling the upward travel of the press plate, means for locking the revoluble table, in relation to the outer upright of the pressing machine, and means for locking the revoluble barrel in position during the mold pressing operation; in combination with a device for removing the mold frame from the pressing machine and loading same in an inverted position on a molding conveyer; and means for synchronously operating the press plate reciprocating means, and the mold frame inverting and discharging means, in sequential order, from a single point of control.

In testimony whereof he has signed this specification.

ETIENNE LEYONDRE.